United States Patent [19]

Negron

[11] Patent Number: 5,023,044
[45] Date of Patent: Jun. 11, 1991

[54] NUCLEAR REACTOR CONTROL ASSEMBLY

[75] Inventor: Scott B. Negron, Forest, Va.

[73] Assignee: The Babcock & Wilcox Company, New Orleans, La.

[21] Appl. No.: 551,216

[22] Filed: Jul. 11, 1990

[51] Int. Cl.$^5$ ................................................ G21C 7/30
[52] U.S. Cl. ................................. 376/213; 376/208; 376/219; 376/220; 376/223
[58] Field of Search .............. 376/208, 213, 219, 220, 376/223; 420/14, 498

[56] References Cited

U.S. PATENT DOCUMENTS

| | | | |
|---|---|---|---|
| 2,852,458 | 9/1958 | Dietrich et al. | 376/213 |
| 3,140,981 | 7/1964 | Huet | 376/223 |

FOREIGN PATENT DOCUMENTS 0671510 10/1963 Canada ................................. 376/223

OTHER PUBLICATIONS

Reflector Drums as Control Mechanism for Compact Thermionic Spacecraft Reactors with $^{233}$V as Fuel by S. Sahin. Nucl. Energy 1979, vol. 18D, No. 640, 401–407.

Primary Examiner—Brooks H. Hunt
Assistant Examiner—Meena Chelliah
Attorney, Agent, or Firm—Robert J. Edwards; D. Neil LaHaye

[57] ABSTRACT

An assembly for controlling the release of neutrons in a nuclear reactor having the core split into two halves. A disk assembly formed from at least two circular disks is positioned substantially at the center of and coaxially with the core halves. Each disk is machined with an identical surface hole pattern such that rotation of one disk relative to the other causes the hole pattern to open or close. The disks may be formed from neutron absorbing material or moderator material. The holes may be provided with fissile material inserts to enhance reactivity when in the open position. A drive motor mounted adjacent the reactor and drive shaft operatively engaged between the drive motor and disks is used to rotate the disks.

9 Claims, 2 Drawing Sheets

NUCLEAR REACTOR CONTROL ASSEMBLY

BACKGROUND OF THE INVENTION

1. Field of the Invention

The invention is generally related to nuclear reactors and more particularly to nuclear reactor control mechanisms.

2. General Background

In nuclear reactors, control mechanisms are required to prevent excessive reactivity, to maintain specific levels of reactivity during operations, and to provide power shaping within the core for the most efficient operation. A second independent control mechanism is usually employed for emergency shutdown. Control mechanisms may be put into four general categories depending upon their basic operating principle: 1) insertion/removal of a fissile, poison, or moderator material into or from the active core region; 2) reflection of leaking neutrons back into the system by variable reflectors, shutters, or rotating drums; 3) geometry changes as in a split core or "godiva" type reactor; and 4) flux shadowing by moving internal parts made of alternating regions of different neutronic materials such as fuel, moderator, or absorber. This movement results in isolation of some core active region from the rest. Patented devices for controlling reactors by the flux shadowing principle of which applicant is aware include the following.

U.S. Pat. No. 2,852,458 discloses coaxial cylinders designed to move rotatably and translatably relative to each other. The cylinders have circumferential sections of material having different neutron absorbing characteristics whereby the movements change the neutron flux shadowing effects.

U.S. Pat. No. 2,898,281 discloses control rods disposed adjacent and parallel to each other with each rod having equal length sections of neutron absorbing and permeable materials and means for longitudinally positioning the rods relative to each other.

U.S. Pat. No. 3,103,479 discloses a control rod formed from different layers of neutron absorbing material.

U.S. Pat. No. 3,347,747 discloses the use of hollow tubes that house neutron absorbing balls wherein the distribution of the balls in the tubes is controlled by fluid flow through the tubes.

U.S. Pat. No. 3,485,717 discloses the use of a cruciform control element formed from tubes having different cross-sectional neutron absorption properties.

U S. Pat. No. 4,707,329 discloses a control rod with inner and outer cylindrical members movable relative to each other and each having alternating poison and nonpoison regions.

Existing control mechanisms are configured in the vertical direction only and most provide only local reactivity changes. No control mechanism exists that divides the core region into halves to provide global power control.

SUMMARY OF THE INVENTION

The present invention addresses the above need in a straightforward manner. What is provided is an assembly for controlling the release of neutrons in a nuclear reactor formed from at least two disks. The disks are machined with identical surface hole patterns such that rotation of one of the disks relative to another causes the hole pattern to open or close. The assembly is positioned at the center of the reactor core such that the disks are coaxial with the reactor core and divide it into two halves. The disks may be made of absorber, moderator, or neutronically transparent material(material that allows the passage of neutrons therethrough), with the holes being a void or having fissile material therein. Rotation of the disks relative to each other to open or close the hole pattern results in a variable attenuation of the incident neutron current resulting in a flux shadowing effect.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 2:
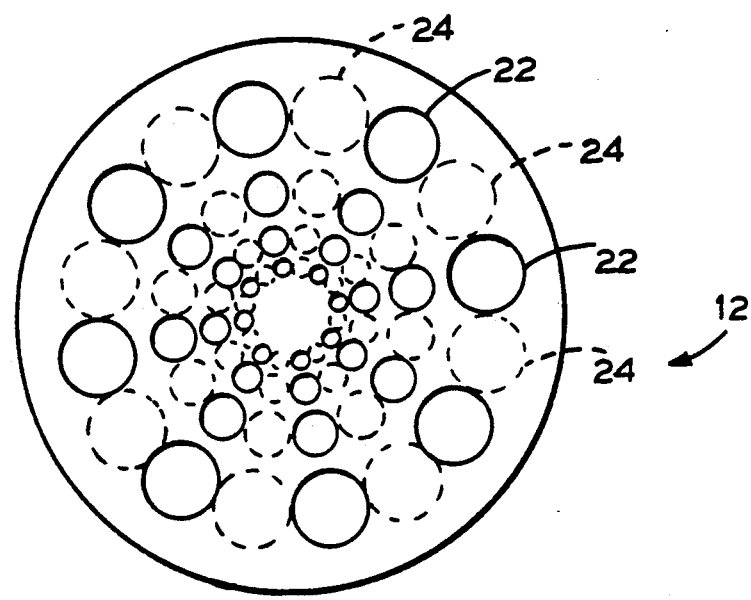
FIG. 2 is a top view of the invention with one of the disks in phantom view.

Referring to the drawings, it is seen that the invention is generally referred to by the numeral 10. Control assembly 10 is comprised of disk assembly 12 and means 14 for rotating disk assembly 12.

Figure 1:
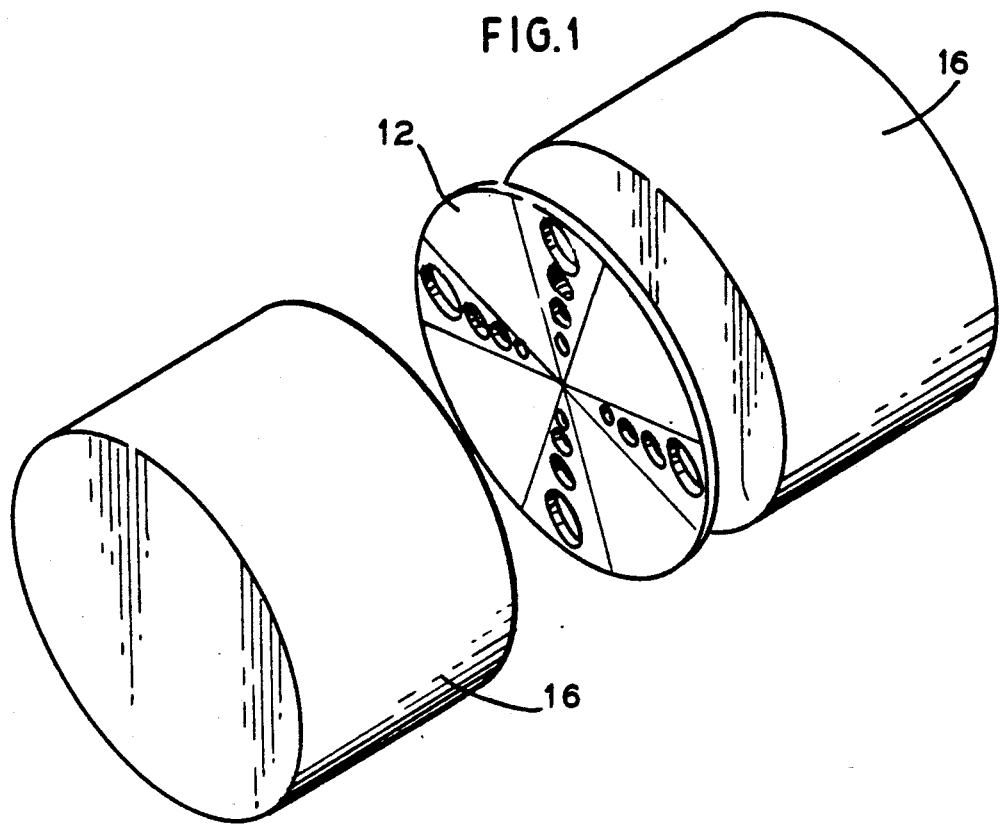
FIG. 1 is a block diagram illustrating the division of a reactor core by the invention.
Figure 3:
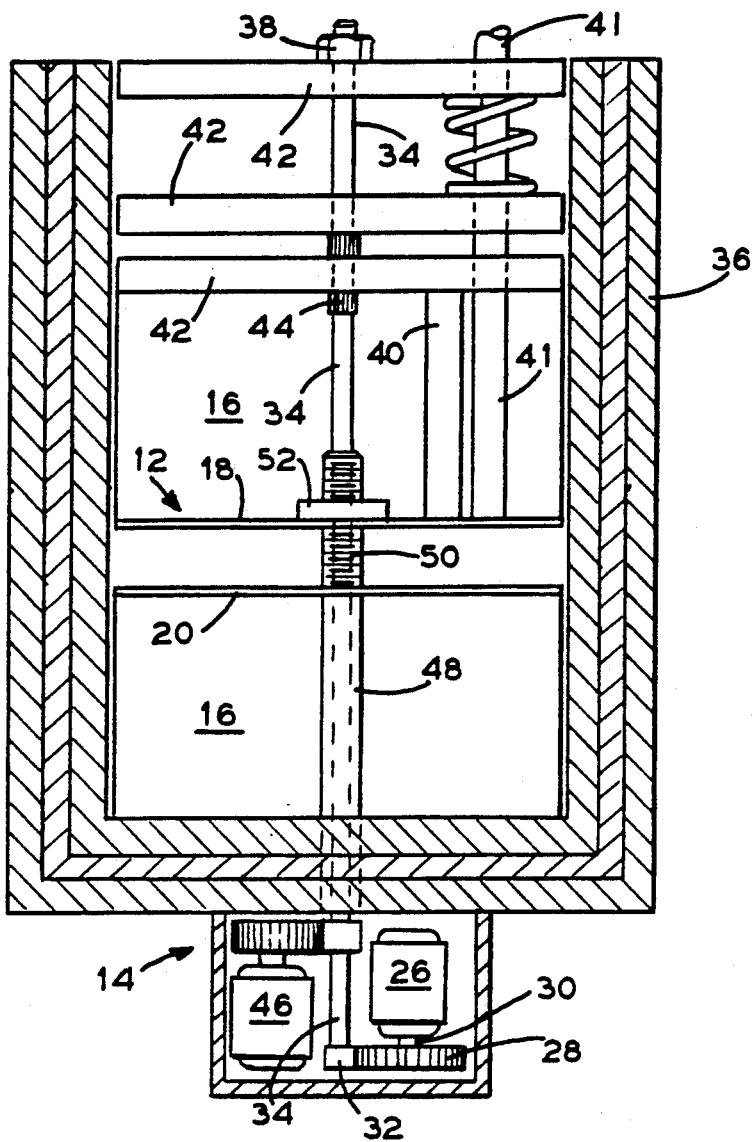
FIG. 3 is a side sectional view of a small core thermionic reactor illustrating typical disk position and spacing of the invention in its installed position.

As seen in the block diagram of FIG. 1, disk assembly 12 is positioned substantially at the longitudinal center of reactor core 16 and is coaxial with reactor core 16. This divides the core 16 into two subcritical halves when disk assembly 12 is in its fully closed position. As seen in FIG. 3, disk assembly 12 is formed from at least two disks 18, 20. Disks 18, 20 are machined with an identical surface hole pattern 22, 24 such that the rotation of one disk relative to the other causes the hole pattern to open or close. Although hole patterns 22, 24 are shown as being circular, it should be understood that the holes may be in any suitable shape such as sectors or triangles. FIG. 2 illustrates the situation where the disks are rotated s that the hole pattern is closed, that is, the holes 22 provided through first disk 18 are not in alignment with the holes 24 provided through second disk 20 and indicated in phantom view. In the preferred embodiment, the disks 18, 20 are formed from neutron absorbing material such as a cadmium or boron alloy with the holes being a void area. Cadmium and boron have large neutron cross sections as neutron absorbers and are used as alloys well known in the industry. Control of the release of neutrons and core reactivity is accomplished by rotating one of the disks relative to the other to open or close the hole pattern. In FIG. 2, the hole pattern is fully closed. This prevents neutrons in one half of the core from reaching the other half and thus divides the core into two subcritical halves. Rotation of one disk relative to another to cause partial or complete alignment of the holes in the disks allows passage of neutrons therethrough and results in an increase in core reactivity. The level of core reactivity is controlled by and is directly related to the amount of overlap of holes 22 and 24 on disks 18, 20.

Means 14 for rotating one disk relative to the other as best seen in FIG. 3(shown with secondary split core control) is mounted adjacent reactor 36. Drive motor 26 is in operative engagement with drive gear 28 through drive shaft 30. Drive gear 28 meshes with gear 32 on disk rotation shaft 34 that extends up through the center of reactor 36. Disk rotation shaft 34 is held in position and rotatably received by retaining nut 38. Fuel elements 40 are rigidly attached between guide plate 42 and first disk 18. Heat pipe 41 is attached to first disk 18 and extends through guide plates 42. The lower guide plate 42 is operatively engaged with disk rotation shaft 34 by means of gear 44 such that plate 42 rotates in response to rotation of disk rotation shaft 34. The rigid connection of heat pipe 41 with guide plate 42 and first disk 18 causes corresponding rotation of first disk 18. Only one fuel element 40 is shown for ease of illustration and it should be understood that a plurality of fuel elements 40 are present in each core half 16 above first disk 18 and below second disk 20. Reactor 36 is shown as the type of reactor wherein the core halves 16 may be moved longitudinally relative to each other to affect reactivity by the use of separation motor 46 and outer drive shaft 48. First control disk 18 is threadably received on the threaded portion 50 of outer drive shaft 48 by thermal fuse 52 such that rotation of outer drive shaft 48 causes first control disk and the upper half of core 16 to move up or down depending on the direction of rotation. Although control assembly 10 is shown as being used in conjunction with movable core halves, it may be used in a reactor where the core halves are stationary. Also, in a reactor with movable core halves, control assembly 10 may be configured to act independently of the core separation mechanism.

Figure 4:
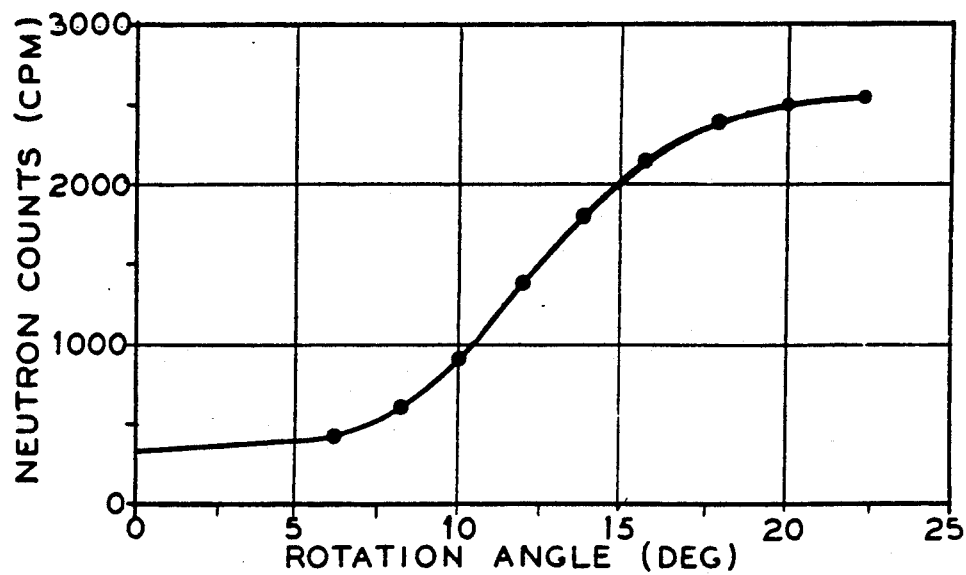
FIG. 4 is a graph illustrating thermal neutron beam attenuation test results of the invention.

In operation, first disk 18 is rotated relative to second disk 20 such that holes 22, 24 are not in alignment to maximize neutron attenuation and keep the reactor core halves 16 isolated from each other and subcritical. To allow an increase in reactivity, first disk 18 is rotated so that holes 22, 24 partially or completely overlap depending on the amount of neutron attenuation and core reactivity desired. As seen in the graph of FIG. 4, a test of a control assembly 10 having a series of holes divided into 45 degree sectors produced a minimum neutron count at zero rotation angle(no hole overlap) and a neutron count of approximately 2500 per minute at a rotation angle of 22.5 degrees(total alignment of holes and exposed area of 25.2 percent). This indicates that predictable control of reactivity can be accomplished using control assembly 10.

As alternate embdiments, moderating material or fissile material may also be used as part of control assembly 10. Fissile material may be used as inserts in holes 22, 24 to amplify neutron flux through the holes when in the open position to enhance reactivity.

Because many varying and differing embodiments may be made within the scope of the inventive concept herein taught and because many modificaitons may be made in the embodiment herein detailed in accordance with the descriptive requirement of the law, it is to be understood that the details herein are to be interpreted as illustrative and not in a limiting sense.

What is claimed as invention is:

1. An assembly for providing global power control in a nuclear reactor having the core split into two halves, said assembly comprising;
   a. a disk assembly formed from at least two disks each machined with an identical surface hole pattern such that rotation of one disk relative to the other causes the hole pattern to open or close, said disk assembly being positioned substantially at the longitudinal center of and coaxial with said core halves; and
   b. means for rotating at least one of said disks relative to the other.

2. The assembly of claim 1, wherein said means for rotating said disks comprises:
   a. a drive motor mounted adjacent said reactor; and
   b. a drive shaft operatively engaged between said drive motor and said disks.

3. The assembly of claim 1, wherein said disks are formed from neutron absorbing material.

4. The assembly of claim 1, wherein the holes in said disks are provided with fissile material inserts.

5. The assembly of claim 3, wherein said disks are formed from a cadmium alloy.

6. The assembly of claim 3, wherein said disks are formed from a boron alloy.

7. The assembly of claim 1, wherein said disks are formed from moderating material.

8. An assembly for providing global power control in a nuclear reactor having the core split into two halves, said assembly comprising:
   a. a disk assembly formed from at least two disks formed from neutron absorbing material, each disk being machined with an identical surface hole pattern such that rotation of one disk relative to the other causes the hole pattern to open or close, said disk assembly being positioned at the longitudinal center of and coaxial with the core halves; and
   b. means for rotating at least one of said disks relative to the other.

9. The assembly of claim 8, further comprising fissile material inserts in the holes in said disks.

* * * * *